United States Patent [19]

Takase et al.

[11] 4,345,132
[45] Aug. 17, 1982

[54] COOKING APPARATUS

[75] Inventors: Akio Takase; Hiroshi Horikoshi; Toshio Kasada, all of Ojima, Japan

[73] Assignee: Mitsubishi Denki Kabushiki Kaisha, Tokyo, Japan

[21] Appl. No.: 98,442

[22] Filed: Nov. 29, 1979

[30] Foreign Application Priority Data

Dec. 1, 1978 [JP] Japan .......................... 53/166185[U]
Dec. 1, 1978 [JP] Japan .......................... 53/166186[U]
Jan. 16, 1979 [JP] Japan .................................... 54/3705

[51] Int. Cl.³ .............................................. H05B 1/02
[52] U.S. Cl. .............................. 219/10.55 B; 219/492; 235/375; 364/400; 340/365 R; 364/682
[58] Field of Search ................. 219/492, 494, 10.55 B, 219/506; 364/646, 682, 900, 400; 340/365 R; 235/375

[56] References Cited

U.S. PATENT DOCUMENTS 3,581,285  5/1971  Neema et al. ........................ 364/900
4,019,175  4/1977  Nakao et al. ......................... 364/900
4,064,560 12/1977  Baxter .................................. 364/900
4,085,446  4/1978  Nagamura ............................ 364/900
4,122,531 10/1978  Tamaru et al. ....................... 364/900

FOREIGN PATENT DOCUMENTS 54-149046 11/1979 Japan ............................ 219/10.55 B

OTHER PUBLICATIONS

Toshiba, ER-899BT-1, "The Brainwave", 5-1977.
SO4290079, "ET-710C Microwave Oven with Magnetic Card Reader", vol. 53, No. 12, 1979, pp. 894-898.

Primary Examiner—B. A. Reynolds
Assistant Examiner—M. Paschall
Attorney, Agent, or Firm—Sughrue, Mion, Zinn, Macpeak & Seas

[57] ABSTRACT

A microwave oven cooking apparatus including a magnetic card reader from which control data may be read to control cooking operations. Data may first be input by the operator from a keyboard control panel. This data is stored in a first memory. Upon completion of the cooking operation, if successful, the operator depresses a control transferring the data stored in the first memory to a second memory from which it is read onto and stored on a magnetic card. The magnetic card can be then reinserted into the card reader for later input of the same cooking operational data.

4 Claims, 3 Drawing Figures

COOKING APPARATUS

BACKGROUND OF THE INVENTION

The present invention relates to cooking apparatuses. More particularly, the invention relates to a cooking apparatus provided with a magnetic card reader in which cooking control data is written onto a magnetic card and cooking operations are affectuated merely by inserting the magnetic card into the magnetic card reader.

Owing to the recent remarkable development of LSI's employed in microcomputers, cooking apparatuses such as electronic cooking stoves, which are now extensively employed as kitchen equipment, often now incorporate a microcomputer device in which cooking procedures are stored by some input means such as a keyboard thereby enabling the stove to carry out intricate cooking operations.

In a conventional cooking apparatus of this type, a person operating the unit must input cooking control data such as cooking time and temperature through an operating input device such as a keyboard whenever cooking is to be done. The time, labor and skill required for this data inputting operation is often substantial. Furthermore, when a cooking operation has been satisfactorily completed, it is often necessary or recommended for the operator to manually record the cooking control data in a cooking notebook so that he can input the same cooking control data a second time. Thus, although a microcomputer has been incorporated into the cooking apparatus, it cannot be said that the number of operating steps in cooking is reduced or that labor is saved. That is, the potential advantages of using a microcomputer have not heretofore been fully utilized.

In view of the foregoing, an object of the invention is to provide a cooking apparatus in which a magnetic card reader is incorporated and cooking control data from a satisfactory cooking operation is recorded on a magnetic card so that the data inputting operation can be readily achieved a second time and in which even if cooking control data is erroneously written onto the magnetic card, the data can be readily rewritten.

SUMMARY OF THE INVENTION

This, as well as other objects of the invention, are met by a cooking apparatus for performing cooking in accordance with cooking control data supplied by input means including first and second input means comprising respectively a keyboard for providing cooking control data and a card reader for reading data from a magnetic card, a first memory means for temporarily storing input data from the first and second input means, second memory means for storing data applied from the first memory means as data to be written exclusively onto the magnetic card, writing means for writing data to be written exclusively onto the magnetic card in response to a predetermined signal, and control means for instructing or causing the writing means to perform a data writing operation upon the presence of a data writing instruction signal from the keyboard and for causing data to be read from the magnetic card when the data writing instruction signal is not present.

There is also to be provided means for producing a signal in response to the presence of a card at a predetermined position in the card reader, this signal being coupled to the control means in response to which the control means produces signals for reading the card. Means is also provided for controlling AC power in response to data stored in the first memory means. The control means preferably includes means for automatically transfering data from the first memory means to second memory means upon completion of a cooking operation. The control means may further include means for resetting the first memory means upon completion of the cooking operation.

DESCRIPTION OF THE PREFERRED EMBODIMENTS

Figure 1:
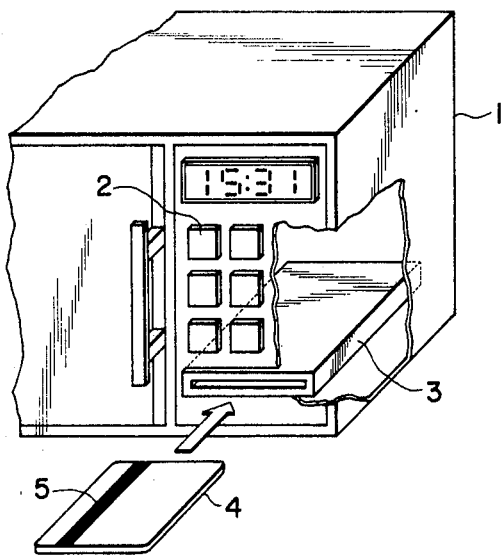
FIG. 1 is an external view showing the essential components of one example of a cooking apparatus according to this invention.

An external view of a cooking apparatus of the invention is shown in FIG. 1. The essential components include a cooking apparatus body 1, a keyboard section 2 which is one of the input means for inputting cooking control data, and a magnetic card reader 3 which is another input means. The magnetic card reader 3 has an operating for inserting a magnetic card 4. The magnetic card reader is incorporated into the body 1 so that the magnetic card insertion opening is below the keyboard section 2. The magnetic card reader 3 has a detecting means 3A, shown in and described in conjunction with FIGS. 2 and 3 which detects, for instance optically, insertion of the magnetic card 4. The magnetic card 4 has a magnetic stripe 5 upon which is stored the cooking control data.

Figure 2:
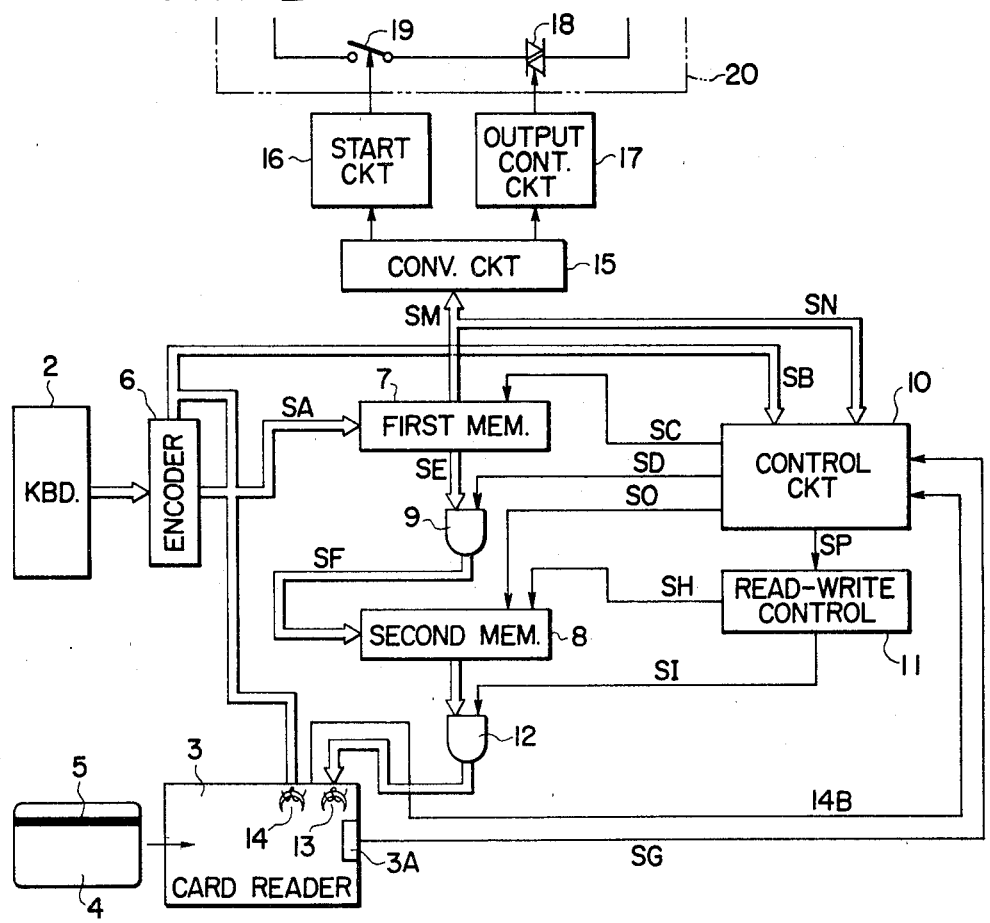
FIG. 2 is a block diagram showing the arrangement of the essential elements of the cooking apparatus shown in FIG. 1.

The electrical arrangement of the essential components of the cooking apparatus according to the invention is as shown in FIG. 2 in which those components which have been previously described with reference to FIG. 1 are therefore similarly numbered and accordingly their detailed descriptions will be omitted.

The cooking control data inputted by the keyboard section 2 is applied to an encoder circuit 6 where it is separated into a numerical data signal and a function signal. A first memory device, first IC memory 7, temporarily stores as cooking data the data which is delivered through the encoder circuit 6 from the keyboard section 2. A second memory device, second IC memory 8, stores as data to be written onto the magnetic card 4, the data which is delivered from the first IC memory 7. Connected between the first IC memory 7 and the second IC memory 8 is a set of AND gates 9. A control circuit 10 operates to control the flow of data therethrough with a control signal applied to an input of each AND gate. A preferred example of the control circuit 10 will be described below. The cooking apparatus further includes a read/write control circuit 11 for controlling the reading and writing operations of the magnetic card reader 3, a set of AND gates 12 connected between the second IC memory 8 and a writing head 13 in the magnetic card reader 3, a reading head 14 for reading data from the magnetic card 4 with the data read therefrom being applied to the first memory 7, a code conversion circuit 15 for converting into a predetermined code the data which is delivered through a signal line SM from the IC memory 7, a start circuit 16 which receives the output of the conversion circuit 15 to operate (open and close) the switch 19 of a power supply circuit 20, and an output control circuit 17 which receives the output of the conversion circuit 15 and controls in accordance therewith the triode AC switch 18 of the power supply circuit 20. In FIG. 2, the heavy arrows indicate the flow of cooking control data while the remaining arrow indicate the flow of other signals.

The data writing and reading operation of the cooking apparatus thus constructed will be described. First, the cooking control data is inputted by the keyboard section 2. The data thus inputted is applied through the signal line SA and the encoder circuit 6 to the first IC memory 7 and is temporarily stored at predetermined positions in the memory 7. Thereafter, the data writing instruction key of the keyboard section is activated and the keyboard output signal is applied through the encoder circuit 6 and the signal line SB to the control circuit 10 as a result of which a read clock signal and a data read signal are applied through the signal lines SC and SD to the first IC memory 7 and the AND gates 9, respectively, by the control circuit 10. In response to the application of these signals to the IC memory 7, the output memory signal of the IC memory 7 is read out onto the signal line SE. In response to the signal applied to the AND gates 9 from the control circuit 10, the AND gates 9 are operated. Thus, the data stored in the first IC memory 7 is transferred via the signal line SF to the second IC memory 8.

After this operation, the magnetic card 4 may be inserted into the magnetic card reader 3. When the insertion of the magnetic card 4 is detected by the optical detecting means 3A, the detection signal is applied to the control circuit 10 whereupon the control circuit 10 drives the read/write control circuit 11 which in turn outputs signals to the signal lines SH and SI. In accordance with the output of the control circuit 11, the memory 8 outputs a memory signal to the signal line SJ. With the aid of the output on the signal line SJ and the signal applied to the signal line SI by the circuit 11, the AND gates 12 are operated and the data stored in the second IC memory 8 is written (magnetically recorded) through the writing head 13 onto the magnetic stripe 5 of the magnetic card 4 successively in synchronization with the (automatic or manual) return movement of the magnetic card 4.

The data stored on the magnetic card 4 is read as follows. A magnetic card 4 storing data is inserted into the magnetic card reader 3. When insertion of the magnetic card 4 is detected by the detecting means 3A, the detection signal is applied to the control circuit 10 via the signal line SG and the control circuit 10 determines whether or not the data writing instruction key of the keyboard section 2 is activated. When the key is not in the "on" state, then the control circuit 10 determines that the circuit is in a reading mode and accordingly successively applies the data stored in the magnetic stripe 5 to the IC memory 7. The IC memory 7 stores the data thus applied.

As is apparent from the above description, not only reading the cooking control data but also writing of the cooking control data can be carried out merely by inserting the magnetic card 4 upon which the operations described above are automatically executed. Therefore, it is unnecessary to record cooking operation data in a cooking notebook or the like. Moreover, the sequence of operations is extremely simple.

In the case where cooking is carried out by inputting data from the keyboard section, the data used as cooking control data is that stored in the first IC memory 7 after cooking has started. The control circuit 10 is so designed that, upon completion of cooking, the data in the first IC memory 7 is automatically transferred to the second IC memory 8 after which the first IC memory 7 is reset (cleared). Accordingly, if it is required to store the present cooking data in the magnetic card 4 after the completion of the cooking, the data can be stored by activating the appropriate predetermined key of the keyboard section 2 and inserting the magnetic card 4 as the required data has been stored in the second IC memory 8.

According to the invention, two data storing IC memories, namely, the first IC memory 7 used exclusively for the control data which is employed in cooking and the second IC memory 8 used exclusively for the data which is to be stored in the magnetic card, are provided. Accordingly, even if data were to be erroneously written onto the magnetic card 4, corrected data can be stored on the magnetic stripe 5 of the magnetic card 4 merely by initiating the writing instruction and inserting the magnetic card 4 once again. Thus, the cooking apparatus is free from a potential inconvenience which occurs if only one IC memory is provided. Namely, if correct data has been stored on the magnetic card, it makes it necessary to reinput the data with the keyboard.

A magnetic card reader according to a so-called "read and alter system" is available in which, while data is being written onto the magnetic card, the data can simultaneously be checked whether or not the data is correct. However, it should be noted that the magnetic card reader of the invention is much lower in cost than such a card reader.

A preferred circuit for the above-described control circuit 10 will be described with reference to FIG. 3. The coded cooking control data applied through the signal line SB is applied separately to the output lines of a decoder circuit 10A, which correspond to the several function key signals and a numerical key signal, by the decoder 10A.

When the data writing instruction key is activated, the read-write discriminating signal line SQ is maintained at a high logical level so long as the key is activated as a result of which a flip-flop circuit 10B is set. The positive logic output of the flip-flop circuit 10B is applied to one input terminal of an AND gate 10C which forms a logic product between this signal and the output of a card insertion detecting signal line SG. At the output of the AND gate 10C is thereby produced the SP signal for driving the read/write control circuit 11 of FIG. 2. A data delivery control circuit 10H is triggered by the output on the read/write discriminating signal line SQ, and a high level signal is provided on the output line SD of the data delivery control circuit 10H only when data is being delivered from the IC memory 7 to the IC memory 8.

When the output of the detecting means 3A is applied to the card insertion detecting signal line SG under the condition that the data writing instruction key is not activated, the reading mode of the magnetic card 4 is actuated by the operations of an AND circuit 10D, a flip-flop circuit 10E and an AND circuit 10F, as a result of which the data on the card is loaded into the IC memory 7. For this purpose, a shift clock signal is provided on the signal line SC through an OR gate 10G. To provide the necessary clock pulse signal synchronous with the reading rate of the magnetic card 4, the shift clock signal and the clock pulse signal on the magnetic stripe 5 which is read from the stripe by the reading head 4b are logically multiplied by the AND circuit 10F.

The operation in the case where, after completion of a cooking operation, the cooking data which was used for that cooking operation is automatically transferred from the IC memory 7 to the IC memory 8 will next be described. The data used for cooking is stored in the IC memory 7. This data is inputted into the control circuit 10 through the signal line SN after completing the cooking operation whereupon it is detected by the cooking completion detecting circuit 10J whether or not the cooking operation has been completed.

For instance, in a case where cooking time is controlled, the remaining time for the cooking operation is detected every second. When the time remaining reaches zero, the detecting circuit 10J provides a signal to trigger the data delivery control circuit 10H whereupon the latter 10H provides a high level signal to the signal line SD. As a result, the AND gate 9 coupled to the IC memory 8 is opened, the shift clock pulse is applied to the signal line SC through the OR gate 10G, and the shift clock pulse for the IC memory 8 is provided on the signal line SO. Transfer of data between the IC memories can be carried out at any desired and practical rate. For this purpose, a clock signal generating circuit 10L is provided. Upon completion of the data transfer, the output on the signal line SD is set to a low logic level and a clear signal generating circuit 10N is driven by an AND gate 10M.

Figure 3:
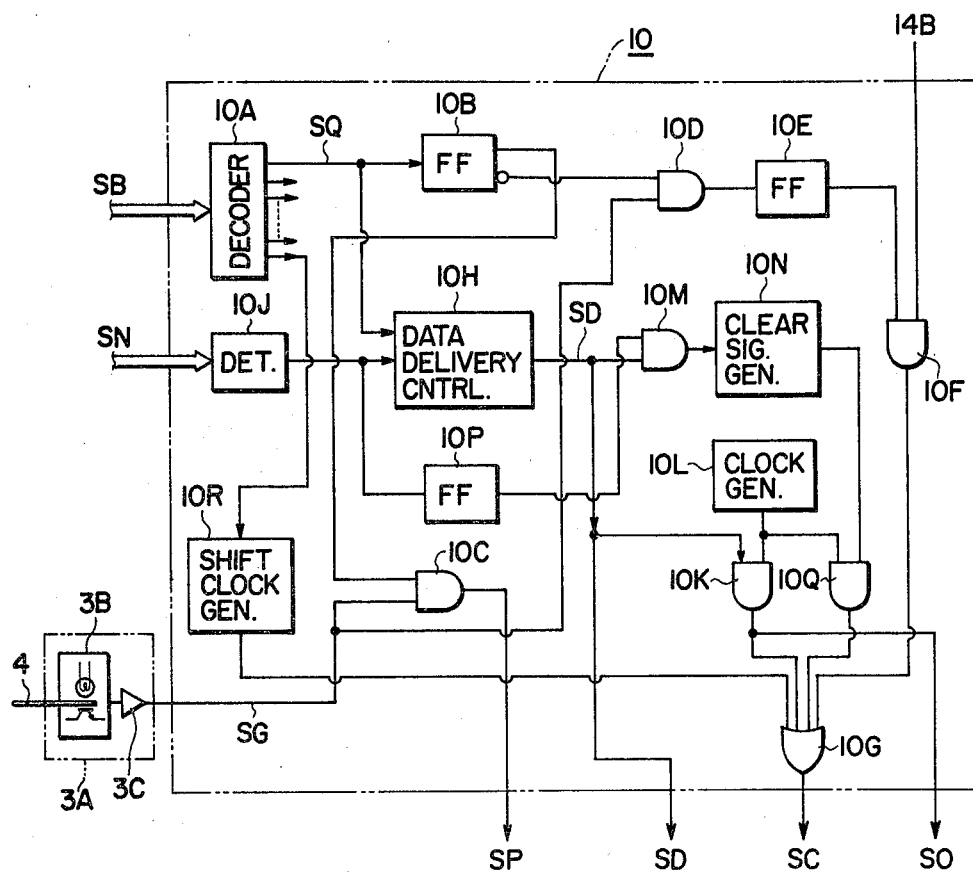
FIG. 3 is also block diagram showing a control circuit included in FIG. 2.

In FIG. 3, reference character 10P designates a flip-flop circuit which is set by the cooking completion detecting circuit 10J. After the cooking operation has been completed, and upon completion of the data transfer the clear signal generating circuit 10N operates with the output of the circuit 10N being applied to the signal line SC through the clock signal generating circuit 10L and an AND gate 10Q. Thus, the content of the IC memory 7 is cleared using an over-flow mode.

The control circuit 10 shown in FIG. 3 further includes a signal generating circuit 10R which operates to input the numerical data into a predetermined portion of the IC memory 7. To accomplish this, the circuit 10R provides the shift clock signal to the signal line SC through the OR gate 10G.

In FIG. 3, reference characters 3B and 3C designate a device for detecting the fact that the magnetic card 4 has been inserted to a predetermined position. More specifically, reference characters 3B and 3C designate an optical detector and an amplifier, respectively, which form the aforementioned detecting device 3A.

In practice, the above-described IC memories 7 and 8, control circuit 10, read/write control circuit 11 and AND gates 9 and 12 may be included in a microcomputer and in fact may be implemented with a single chip or other single hardwired device.

As is apparent from the above description, according to the invention, the cooking control data inputting operation is considerably simplified over that of the prior art, the time, labor and skill required for executing a cooking operation are markedly reduced and, accordingly, intricate cooking control can be achieved with a very simple operation. Thus, the merits of utilizing a microcomputer for controlling a cooking apparatus can be fully realized. In addition, the data written onto the magnetic card can be readily changed or corrected.

What is claimed is:

1. A cooking apparatus for performing cooking in accordance with cooking control data supplied thereto by input means comprising:
   (a) first and second input means comprising a keyboard for providing cooking control data and a card reader for reading data from a magnetic card;
   (b) first memory means for temporarily storing input data from said first and second input means;
   (c) second memory means for storing data applied thereto from said first memory means as data to be written exclusively onto said magnetic card;
   (d) writing means for writing said data to be written exclusively onto said magnetic card in response to a predetermined signal; and
   (e) control means for causing said writing means to perform data writing upon the presence of a data writing instruction signal from said keyboard, and for causing data to be read from said magnetic card when said data writing instruction signal is not present, and for causing transfer of data from said first memory means to said second memory means upon detection of the end of the cooking operation.

2. The cooking apparatus of claim 1 further comprising means for producing a signal in response to the presence of a card at a predetermined position in said card reader, said signal being coupled to said control means, said control means producing signals for reading said card in response to said signal.

3. The cooking apparatus of claim 1 further comprising means for controlling AC power in response to data stored in said first memory means.

4. The cooking apparatus of claim 1 wherein said control means further comprises means for resetting said first memory means upon completion of said cooking operation.

* * * * *